(12) United States Patent
Dondeti

(10) Patent No.: US 8,594,323 B2
(45) Date of Patent: Nov. 26, 2013

(54) METHOD AND APPARATUS FOR GENERATING LARGE NUMBERS OF ENCRYPTION KEYS

(75) Inventor: Lakshminath Dondeti, Chelmsford, MA (US)

(73) Assignee: Rockstar Consortium US LP, Plano, TX (US)

( * ) Notice: Subject to any disclaimer, the term of this patent is extended or adjusted under 35 U.S.C. 154(b) by 2166 days.

(21) Appl. No.: 10/946,322

(22) Filed: Sep. 21, 2004

(65) Prior Publication Data
US 2006/0062384 A1   Mar. 23, 2006

(51) Int. Cl.
*H04L 9/00* (2006.01)

(52) U.S. Cl.
USPC .............................................. 380/44; 380/277

(58) Field of Classification Search
USPC ............... 380/44, 47, 278, 283; 713/163, 171
See application file for complete search history.

(56) References Cited

U.S. PATENT DOCUMENTS

| | | | | |
|---|---|---|---|---|
| 4,200,770 A * | 4/1980 | Hellman et al. | .................. | 380/30 |
| 5,420,928 A * | 5/1995 | Aiello et al. | .................... | 380/46 |
| 5,784,461 A * | 7/1998 | Shaffer et al. | .................... | 705/51 |
| 5,802,175 A * | 9/1998 | Kara | .............................. | 380/277 |
| 6,049,878 A * | 4/2000 | Caronni et al. | .................... | 726/3 |
| 6,185,304 B1 * | 2/2001 | Coppersmith et al. | .......... | 380/37 |
| 6,195,751 B1 * | 2/2001 | Caronni et al. | ............... | 713/163 |
| 6,240,188 B1 * | 5/2001 | Dondeti et al. | ............... | 380/284 |
| 6,263,435 B1 * | 7/2001 | Dondeti et al. | ............... | 713/163 |
| 6,266,412 B1 * | 7/2001 | Berenzweig et al. | .......... | 380/37 |
| 6,330,671 B1 * | 12/2001 | Aziz | ............................. | 713/163 |
| 6,345,098 B1 * | 2/2002 | Matyas et al. | .................. | 380/46 |
| 6,363,154 B1 * | 3/2002 | Peyravian et al. | ............ | 380/283 |
| 6,553,470 B1 * | 4/2003 | Matsukawa et al. | .......... | 711/162 |
| 6,584,566 B1 * | 6/2003 | Hardjono | ....................... | 713/163 |
| 6,628,786 B1 * | 9/2003 | Dole | ............................. | 380/44 |
| 6,715,078 B1 * | 3/2004 | Chasko et al. | ................ | 713/193 |
| 6,941,457 B1 * | 9/2005 | Gundavelli et al. | ........... | 713/163 |
| 6,983,051 B1 * | 1/2006 | Rhoads | ......................... | 380/252 |
| 6,987,855 B1 * | 1/2006 | Srivastava | ..................... | 380/278 |
| 7,089,211 B1 * | 8/2006 | Trostle et al. | ................... | 705/51 |
| 7,096,356 B1 * | 8/2006 | Chen et al. | ..................... | 713/163 |

(Continued)

OTHER PUBLICATIONS

Kaufman, Charlie, Internet Key Exchange (IKEv2) Protocol, May 29, 2004, IETF.*

(Continued)

*Primary Examiner* — Fikremariam A Yalew
(74) *Attorney, Agent, or Firm* — Anderson Gorecki & Rouille LLP

(57) ABSTRACT

Entropy obtained from a series of key generation exchanges may be combined with entropy from a strong entropy source to allow the strong entropy to be stretched to generate a larger number of keys for use on a communication network, without requiring additional information from the group members and without requiring the entropy source to be increased in size or in number. In one embodiment, nonces exchanged during an initial key exchange are used to generate additional key material that is then fed, together with a fresh random secret, to another pseudo-random function to generate an additional key stream. The fresh ransom secret may be generated at the GCKS from a physical entropy source or other entropy source, and may be changed at will by the GCKS to further increase the strength of the keys. The methods are particularly useful for group key management where a large number of keys are required to be generated in a short time frame.

18 Claims, 2 Drawing Sheets

(56) References Cited

U.S. PATENT DOCUMENTS

| | | | |
|---|---|---|---|
| 7,123,719 B2* | 10/2006 | Sowa et al. | 380/247 |
| 7,234,058 B1* | 6/2007 | Baugher et al. | 713/163 |
| 7,234,063 B1* | 6/2007 | Baugher et al. | 713/189 |
| 7,308,575 B2* | 12/2007 | Basil et al. | 713/168 |
| 7,350,069 B2* | 3/2008 | Herz et al. | 713/150 |
| 7,426,746 B2* | 9/2008 | Mononen et al. | 726/4 |
| 2002/0035687 A1* | 3/2002 | Skantze | 713/168 |
| 2002/0138850 A1* | 9/2002 | Basil et al. | 725/117 |
| 2002/0154776 A1* | 10/2002 | Sowa et al. | 380/247 |
| 2003/0031322 A1* | 2/2003 | Beckmann et al. | 380/278 |
| 2003/0194085 A1* | 10/2003 | Dillaway | 380/29 |
| 2004/0109567 A1* | 6/2004 | Yang et al. | 380/277 |
| 2004/0151322 A1* | 8/2004 | Sovio et al. | 380/278 |
| 2005/0055576 A1* | 3/2005 | Mononen et al. | 713/201 |
| 2005/0097317 A1* | 5/2005 | Trostle et al. | 713/163 |
| 2005/0187873 A1* | 8/2005 | Labrou et al. | 705/40 |
| 2007/0124592 A1* | 5/2007 | Oyama | 713/171 |

OTHER PUBLICATIONS

D. Eastlake, Internet Engineering Task Force (IETF) Request for Comments (RFC) 1750, *Randomness Recommendations for Security* (Dec. 1994).

L. Dondeti, IETF Internet Draft (ID), *GDOIv2: An Efficient Group Key Distribution Protocol*, draft-ietf-msec-gdoiv2-00 (Aug. 2004).

M. Baugher, et al., IETF-ID, *MSEC Group Key Management Architecture*, draft-ietf-msec-gkmarch-08 (Jun. 2004).

C. Kaufman, IETF-ID, *Internet Key Exchange (IKEv2) Protocol*, draft-ietf-ipsec-ikev2-16 (Sep. 2004).

* cited by examiner

METHOD AND APPARATUS FOR GENERATING LARGE NUMBERS OF ENCRYPTION KEYS

BACKGROUND

1. Field

This application relates to communication networks and, more particularly, to a method and apparatus for generating large numbers of encryption keys for use on a communication network.

2. Description of the Related Art

Data communication networks may include various computers, servers, nodes, routers, switches, hubs, proxies, and other devices coupled to and configured to pass data to one another. These devices will be referred to herein as "network elements," and may provide a variety of network resources and services on the network. Conventionally, data has been communicated through data communication networks by passing protocol data units (such as packets, cells, frames, or segments) between the network elements by utilizing one or more communication links extending between the network elements. A particular protocol data unit may be handled by multiple network elements and cross multiple communication links as it travels between its source and its destination over the network.

To allow communications to take place in a secure manner on the communication network, it has become common to encrypt the communications, generally using encryption keys. Encryption keys are random strings of numbers that may have any number of characters. The longer the character string, and the more unpredictable the characters in the string, the stronger the key is said to be. As keys become stronger, the communications they encrypt become safer because it is harder to guess or infer the key that was used to encrypt the communication.

Since the strength of an encryption key depends in large part on the unpredictability of the characters in the key, generation of strong encryption keys requires the key generation program or network element to have access to a source of random numbers, referred to herein as an entropy source. If the entropy source is predictable, the values created by the entropy source will be easier to guess, and the strength of the keys created by the entropy source will be reduced accordingly.

Physical entropy sources may be used to generate random numbers for use in creating encryption keys, and may be considered somewhat superior to software entropy sources due to the unpredictability of the random information created. A few physical entropy sources include thermal noise, radioactive decay, oscillators, and disc drives, although other physical entropy sources exist as well. While physical entropy sources are able to generate truly random information, and hence may be used to create very strong encryption keys, they generally tend to be relatively slow. For example, the rotational speed of the disc in a computer disc drive may be used to generate random information. However, since the speed may not vary considerably in a short period of time, a disc drive-based physical entropy source may only generate sufficient random information to generate up to a few keys per second. As the keys become larger, the rate at which they may be generated is concomitantly reduced.

As networks have become larger, and the number of entities encrypting traffic on the networks has risen, the need for a source of strong encryption keys has increased. One driving force behind this need for encryption keys is the proliferation of Virtual Private Networks (VPNs). VPNs allow private traffic to be shared between VPN sites over a public network by securing the traffic in such a manner that other users of the communication network are not able to see the private traffic. There are several ways to do this, many of which involve encrypting the traffic before transmitting the traffic onto the communication network.

As VPNs increase in size and number, generation of keys by the group members has been replaced by centralized key management systems, referred to herein as Group Control Key Servers (GCKSs). A GCKS may provide many services on the network as well as key generation and management. While a large GCKS on the network may be required to generate thousands or tens of thousands of encryption keys for use by members of one or more Virtual Private Networks. Unfortunately, physical entropy sources are generally unable to provide a sufficient number of random values to generate strong keys for use in this environment, and software entropy sources may be too predictable to provide sufficiently strong encryption keys.

SUMMARY OF THE DISCLOSURE

According to an embodiment of the invention, a Group Controller Key Server (GCKS) generates additional random values from an initial exchange with group members that may be used to stretch a random value generated by the GCKS into multiple keys. In this manner, the GCKS is able to use a combination of physical and software entropy sources to allow entropy from a physical or other entropy source to be stretched to generate a large number of random keys for use on the network, without requiring additional information from the group members and without requiring the entropy source to be increased in size or in number.

According to an embodiment of the invention, group members exchange nonces and Diffie-Hellman values with GCKS according to an initial key exchange protocol such as Internet Key Exchange version two (IKE-v2). These values are fed into a pseudo-random function to create a seed key that will be used in a second pseudo-random function to create a string of keys for use by the group member for encrypting traffic on the network. The second pseudo-random function also creates additional random bits, in addition to the random bits used to create the key string, which is input to another third pseudo-random function along with a fresh random secret to generate additional keys for use on the network. The fresh random secret may be generated at the GCKS from a physical entropy source or other entropy source, and may be changed at will by the GCKS to further increase the strength of the keys. This allows a single strong entropy source, used to create the fresh random secret, to be stretched into a plurality of keys for use by group members by allowing it to be combined with other entropy information supplied by members of the group.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
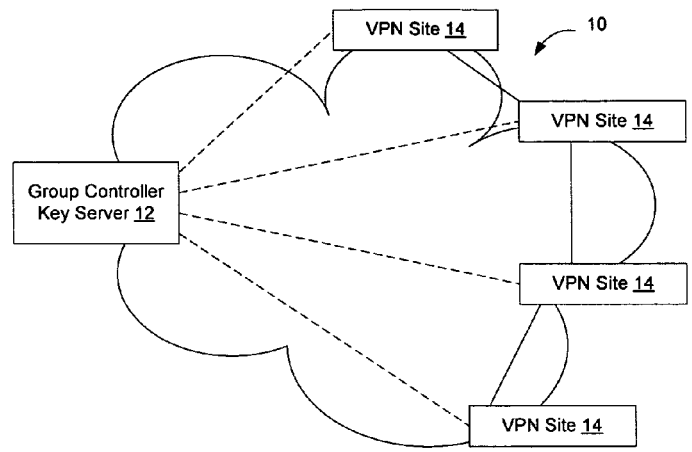
FIG. 1 is a functional block diagram of an example of a communication network including a Group Controller Key Server (GCKS) according to an embodiment of the invention.

FIG. 1 illustrates an example communication network architecture 10 according to an embodiment of the invention in which a Group Controller Key Server (GCKS) 12 is configured to generate and distribute encryption keys for use by VPN sites 14 to allow the VPN sites to communicate securely over the network.

The GCKS may perform numerous functions on the network and the following description will focus on only a subset of those features. Specifically, the following description will focus on the GCKS' role in creating and distributing keys for use by VPN sites to allow the VPN sites to communicate securely over the network. The GCKS may also perform other functions for the VPN or for the network, such as providing access control on the VPN, defining VPN membership, overseeing route exchanges on the network, and otherwise configuring the topography of the VPN network. Thus, a GCKS may perform multiple functions on the network in addition to handling the key exchange aspects discussed herein and the invention is not limited to a network element or process that solely handles key generation and exchange.

As shown in FIG. 1, the GCKS 12 communicates with each of the VPN sites 14 requiring encryption services, and controls distribution of keys to the sites to control which sites can communicate with each other. By controlling which sites can communicate, the GCKS controls the topography of the VPN network. The keys may be used to secure communications between the GCKS and the network elements, or may be used to secure the data path between the various network elements. For example, a group of VPN sites may use a common key while other VPN sites on the same VPN will use a different key. Since sites without access to a key can't decipher the communications, only those sites having access to a key may participate on that branch of the particular VPN. The architecture illustrated in FIG. 1 has been simplified to highlight the interaction between the GCKS and the VPN sites. An actual implementation of a GCKS system may involve multiple GCKSs in a flat or tiered relationship and configured to interface thousands or more VPN sites on the communication network. Thus, the invention is not limited to the architecture illustrated in FIG. 1 but rather extends to numerous network architectures.

Figure 2:
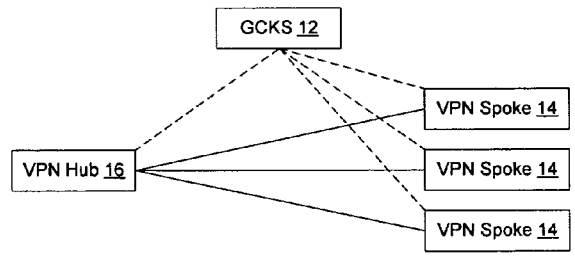
FIG. 2 is a functional block diagram of hub and spoke VPN architecture configured to use a GCKS for distribution of keys according to an embodiment of the invention.
Figure 3:
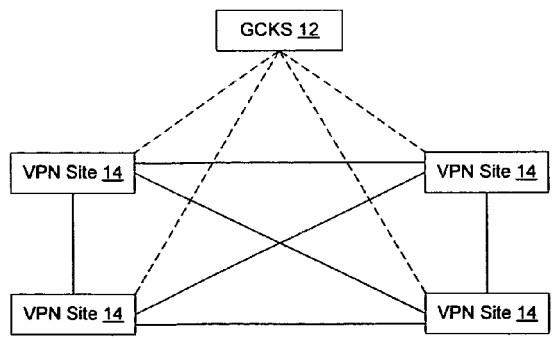
FIG. 3 is a functional block diagram of mesh VPN architecture configured to use a GCKS for distribution of keys according to an embodiment of the invention.

FIGS. 2 and 3 illustrate, in a simplified manner, several common VPN network topographies that may be created through the appropriate provisioning of keys to VPN members, and through other conventional mechanisms such as by controlling the dissemination of routing information between the VPN members. FIG. 2 illustrates a hub-and-spoke Virtual Private Network (VPN) architecture in which VPN sites 16 are configured to be able to communicate with a VPN hub 18, but not with each other. FIG. 3 illustrates a meshed VPN architecture in which specific VPN sites 16 may be allowed to communicate with one or more other VPN sites in the meshed architecture. In either instance, secure keys must be generated and distributed to the various sites and hubs to allow the communications to take place. The GCKS 12, according to an embodiment of the invention, is configured to generate large numbers of keys for use in these and other types of secure network architectures.

Keys may be used in many different ways on the network. For example, a given key may be used to communicate with members of a group to secure communications between the members and the GCKS. This key may be used, for example, to allow the GCKS to pass one or more traffic encryption keys to the group member so that that group member can communicate with a subset of the other group members. Keys that are used to communicate between group members and the GCKS are commonly referred to as Key-Exchange Keys (KEKs) and keys that are used to communicate between group members to encrypt traffic are generally referred to as Traffic Encryption Keys (TEKs). As used herein, the term "key" will be used in a generic sense to refer to KEKs, TEKs, and other forms of keys intended for other uses. The manner in which keys are distributed and used by the nodes is well documented and thus will not be explained in any greater detail herein.

According to an embodiment of the invention, a Group Controller Key Server (GCKS) generates additional random values from an initial exchange with group members that may be used to stretch a random value generated by the GCKS into multiple keys. In this manner, the GCKS is able to use a combination of physical and software entropy sources to allow entropy from a physical or other entropy source to be stretched to generate a large number of random keys for use on the network, without requiring additional information from the group members and without requiring the entropy source to be increased in size or in number.

According to an embodiment of the invention, group members exchange nonces and Diffie-Hellman values with GCKS according to an initial key exchange protocol such as Internet Key Exchange version two (IKE-v2). These values are fed into a pseudo-random function to create a seed key that will be used in a second pseudo-random function to create a string of keys for use by the group member for encrypting traffic on the network. The second pseudo-random function also creates additional random bits, in addition to the random bits used to create the key string, which is input to another third pseudo-random function along with a fresh random secret to generate additional keys for use on the network. The fresh random secret may be generated at the GCKS from a physical entropy source or other entropy source, and may be changed at will by the GCKS to further increase the strength of the keys. This allows a single strong entropy source, used to create the fresh random secret, to be stretched into a plurality of keys for use by group members by allowing it to be combined with other entropy information supplied by members of the group.

Initially, the GCKS generate an initial key to be used as a seed key. This may be done using a physical or other source of entropy in a conventional manner. Alternatively, the GCKS may generate the initial key by starting with a fresh random secret generated from a resident or interfaced entropy source and collecting entropy from group members seeking keys and delaying providing keys to the group members until a sufficient amount of entropy has been collected. The seed key is thus formed from the native entropy optionally combined with other entropy provided by group members using a pseudo-random function.

If a new key is then required by a group member, the group member sends a request for a key to the GCKS and includes in the request a nonce generated by the group member. The nonce may be used directly for communications between the group member and the GCKS, and will be used to generate additional keys for use by the group member or other group members. Optionally, the GCKS may screen nonces generated by group members to discard nonces that are of week value or do not contain sufficient entropy. For example, a group member that returns as a nonce the name of the group member may be deemed to be of insufficient randomness to be useable to generate a subsequent key.

Once a new key has been generated, the key is then returned to the group member. A given member only knows the nonce that it generated and sent to the server, and the one that it receives from the server. These nonces are used to protect the session and are used as inputs to a prf that may be used to generate additional keys. However, since the nonce is used with other secret information that the GCKS has or collects, no key for use with other group members is generated by nonces from a single session, so that the keys are not predictable given known inputs.

Occasionally, it may be desirable to update the initial source of entropy that was used to generate the seed key. This may be done by the GCKS by changing the initial fresh random secret that is used to generate subsequent keys. For example, the GCKS may obtain sufficient entropy from a physical entropy source to generate a new fresh random secret every 5 seconds. The GCKS may used this new fresh random secret to generate subsequent keys, while maintaining the extended source of entropy collected from generating keys for other group members. Other embodiments may be possible as well and the invention is not limited to this particular embodiment.

To help explain how the invention may be practiced in a practical context, an example will be provided in which an embodiment of the invention is used to modify a conventional key exchange protocol, referred to herein as Internet Key Exchange version two, (IKEv2), to allow an increased number of keys to be generated. Since the following example illustrates a modification to the IKEv2 protocol, some of the terminology that will be used to describe this example will be similar to the terminology used to describe that standard. The invention is not limited to use of the concepts within the IKEv2 protocol, however, as the principles of the invention may be used with many other types of key exchange protocols, and the manner in which the keys are generated may be used in many different contexts. Thus, for example, similar modifications may be made to key exchange protocols such as:

Internet Security and Key Management Protocol (ISAKMP), an Internet standard defined by Internet Engineering Task Force (IETF) Request For Comments (RFC) 2408, which describes a key management protocol for establishing security associations and cryptographic keys in the Internet environment Internet Key Exchange (IKE), Group Domain and Interpretation (GDOI) which provides encryption keys and cryptographic policy for groups of users;

Group Domain and Interpretation version two (GDOIv2), a group key distribution protocol:

and numerous other existing and to be developed protocols.

Figure 4A:
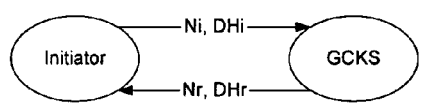
FIGS. 4A-4D illustrate a process of generating keys according to an embodiment of the invention.
Figure 4B:
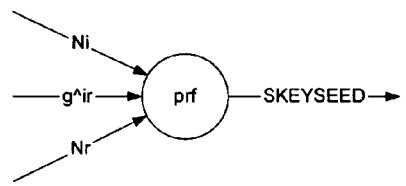
Figure 4C:
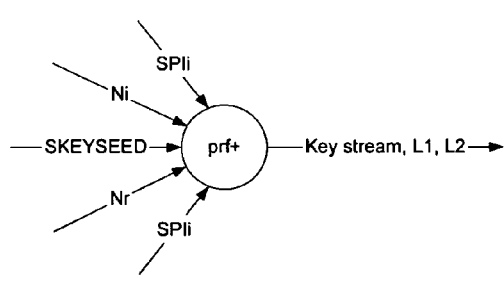

FIGS. 4A-4C illustrates a process of generating a large number of keys for use on a communication network according to one embodiment of the invention. Although the keys are described for use on a communication network, the keys may be used in other contexts as well and the invention is not limited to an embodiment that generates keys to be used to secure communication on a network.

As shown in FIG. 4A, when an initiator and responder wish to enter into a secure relationship, four cryptographic algorithms are negotiated: an encryption algorithm, an integrity protection algorithm, a Diffie-Hellman group, and a pseudo-random function (prf). Examples of pseudo-random functions that may be used include the Message Digest (MD) algorithms, such as MD-5, the Secure Hash Algorithms (SHA) such as SHA-1, and numerous other algorithms. The invention is not limited to use of a particular pseudo-random function. Once the process has been agreed, the initiator will generate a nonce (Ni=a one time used number) and its half of the Diffie-Hellman value (DHi), and will transmit this information to the GCKS. The GCKS will similarly generate a nonce (Nr) and a Diffie-Hellman value (DHr) and pass those values to the initiator.

As shown in FIG. 4B, the initiator's nonce, responder's nonce, and the Diffie-Hellman function (g^ir) are input to an agreed pseudo-random function (prf) to generate an initial random value SKEYSEED that will be used to generate a key stream. Generation of the value SKEYSEED may be performed in connection with the IKEv2 protocol, although the invention is not limited in this manner. If the IKEv2 protocol is used, the quantity SKEYSEED is calculated from the nonces exchanged during the IKE_SA_INIT exchange (discussed above in connection with FIG. 4A) and the Diffie-Hellman shared secret established during that exchange. SKEYSEED and its derivatives are computed as follows:

$$SKEYSEED = prf(Ni|Nr, g\hat{}ir)$$

Where Ni is the initiator's nonce, Nr is the responder's nonce, and g^ir is the shared secret from the ephemeral Diffie-Hellman exchange. g^ir is represented as a string of octets in big-endian order padded with zeros if necessary to make it the length of the modulus. Ni and Nr are the nonces, stripped of any headers.

Keying material is derived as the output of the negotiated prf algorithm. Since the amount of keying material needed may be greater than the size of the output of the prf algorithm, the prf algorithm may be used iteratively. The term prf+ will be used to describe the function that outputs a pseudo-random stream based on the inputs to a prf as follows: (where | indicates concatenation)

$$prf+(K,S) = T1|T2|T3|T4|\ldots$$

where:
T1=prf (K, S|0x01)
T2=prf (K, T1|S|0x02)
T3=prf (K, T2|S|0x03)
T4=prf (K, T3|S|0x04)

This function may continue to be used, as needed, to generate random information to generate a sufficient number of random bits to generate keys for the exchange. The keys are taken from the output string of the pseudo-random function.

The constant (0x01, 0x02, 0x03 . . . ) concatenated to the end of each string feeding the prf is a single octet. The concatenation pseudo-random function may have a size limit, if desired. For example, in IKE-v2, prf+ is not defined beyond 255 times the size of the prf output. The invention is not limited in this manner, however, as other prf+ functions may be used as well. Particularly, since in one embodiment of the invention the value K is being changed in subsequent iterations, the repeated application of the prf is not weakened and the prf+ function may thus be used to extend beyond the 255 times size limit.

As shown in FIG. 4C, the prf+ pseudorandom function is used to generate a key stream including seven keys. Other numbers of keys may be used as well and the invention is not limited in this manner. For example, in IKEv2, the prf+ will use the SKEYSEED value generated using the process discussed above, the nonces from the initiator and responder, and two Security Parameter Indices, SPIi and SPIr which serve to identify the security association, to generate seven keys:

$$\{SK\_d|SK\_ai|SK\_ar|SK\_ei|SK\_er|SK\_pi|SK\_pr\} = prf+(SKEYSEED, Ni|Nr|SPIi|SPIr)$$

Where:
SK_d (Secret Key—derived) used for deriving new keys for the CHILD_SAs established with this IKE_SA;
SK_ai (Secret Key—authenticating initiator) and SK_ar (secure key—authenticating responder) used as a key to the integrity protection algorithm for authenticating the component messages of subsequent exchanges;
SK_ei (Secret Key—encryption initiator) and SK_er (Secret Key—encrypting responder) used for encrypting (and of course decrypting) all subsequent exchanges; and
SK_pi (Secret Key—used for the payload of initiator) and SK_pr (Secret Key—used for the payload of responder) which are used when generating an AUTH payload.

The two directions of traffic, in this embodiment, use different keys and thus the method described herein has calculated two keys. The keys used to protect messages from the original initiator are SK_ai and SK_ei. The keys used to protect messages in the other direction are SK_ar and SK_er. Each algorithm takes a fixed number of bits of keying material, which is specified as part of the algorithm. Where a different algorithm was to be used, the keys and the functions used to create the keys may be changed without departing from the scope of the invention.

According to an embodiment of the invention, in addition to calculating the key stream required for use by the initiator and responder, the SKEYSEED is also used to calculate two additional values SK_P_KEK and SK_S_KEK (referred to as L1 and L2 in FIGS. 4C and 4D) which may be used as inputs to another pseudorandom function to generate additional keys for use with other group members. Note that no new random information is needed from the GCKS to generate these additional values. Specifically, $$\{SK\_d|SK\_ai|SK\_ar|SK\_ei|SKcr|SK\_pi|SK\_pr|SK\_P\_KEK|SK\_S\_KEK\} = prf(SKEYSEED, Ni|Nr|SPIi|SPIr)$$

Figure 4D:
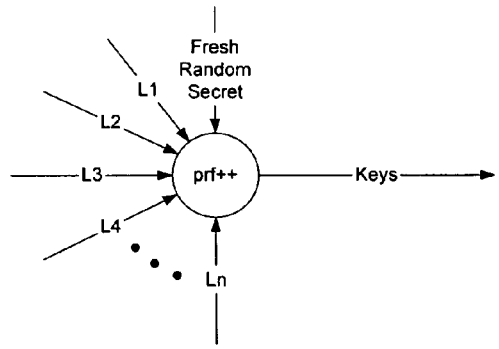

As shown in FIG. 4D, these additional values SK_P_KEK and SK_S_KEK may be used to stretch entropy from another entropy source to allow the entropy source to create a large number of keys for use on the communication network. Specifically, these values may be used, as shown in FIG. 4D, to create a second string of key material, which may be used to create keys for use on the network. The stream of keys (SK_ks—Secret Key key stream) may be represented as:

$$SK\_ks = prf(\text{fresh random secret}, SK\_S\_KEK1|SK\_S\_KEK2|SK\_S\_KEK3|\ldots)$$

or, if SK_S_KEK1=L1 and SK_S_KEK2=L2, then:

$$SK\_ks = prf(\text{fresh random secret}, L1|L2|L3|\ldots |Li),$$
$$1 <= i <= n,$$

In this embodiment, the pseudorandom function used to create the new string of keys may be known only to the GCKS to increase security of the process. Alternatively, since the fresh random secret is only known to the GCKS and can be changed at will by the GCKS, the pseudorandom function may be publicly known.

The fresh random secret may contain random information generated by a physical entropy source or may contain random information generated in another manner. However obtained, since the entropy contained in the fresh random secret will be combined with random information generated during other key exchanges, the entropy contained in the fresh random secret may be stretched to generate a large number of keys. This allows entropy from a physical entropy source to be combined with other sources of entropy to generate a large number of secure keys. Additionally, since the fresh random secret can be changed at will, the key generation process may continuously be changed to further increase the security associated with generating keys.

In the above description, the fresh random secret is a local secret at the GCKS, and is not known to the outside world. This is a source of randomness that makes it more difficult to decipher the seed key and makes it more difficult to deduce one key if access to the other keys is obtained. Additionally, the fresh random secret may be changed to make it less likely that a pattern may be exploited to obtain the keys. By using other strong random information supplied by group members and derived from the initial prf, this fresh random secret may be stretched to generate many secret keys where it could previously only be used to generate a limited number of secret keys.

Additionally, since multiple SK_S_KEKs are created in each derivation, and because of the local secret, the fact that a nonce and SPI are supplied by a possible adversary (even one of the group members) is not a threat to the other group members. The strength of the algorithm is dependant on the fresh random secret and the pseudo-random function used. Several such pseudo-random functions that may be used in connection with generating the key stream include the message digest (MD) algorithms, such as MD-5, and the secure hash algorithms (SHA) such as SHA-1), although the invention is not limited to the use of one of these particular algorithms as many extant and to be developed algorithms may be used.

Figure 5:
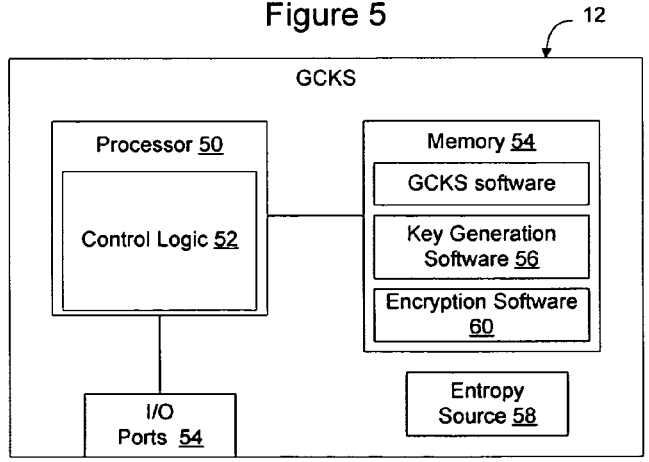
FIG. 5 is a functional block diagram of a GCKS according to an embodiment of the invention.

FIG. 5 illustrates an embodiment of a network element configured to implement the GCKS according to an embodiment of the invention. The GCKS may be embodied in a separate network element, as illustrated, or may be implemented as a process on another network element configured to perform other functions on the network. The invention is not limited to the manner in which the GCKS is embodied on the network or the manner in which the GCKS is configured to be implemented in a network element.

In the embodiment of the data management service illustrated in FIG. 5, the GCKS is configured to be implemented on a network element including a processor 50 having control logic 52 configured to implement the functions ascribed to the GCKS discussed herein in connection with FIGS. 1-4. Input/Output (I/O) ports may be provided to enable the network element to communicate with other network elements on the network.

The network element has a native or interfaced memory containing data and instructions to enable the processor to implement the functions ascribed to it herein. For example, the memory may contain a key generation software module configured to receive inputs from initiators and generate keys for use on the network, as discussed in greater detail above. A physical or software entropy source 58 may be included to provide the GCKS with a source of random information, for example for use in generating an initial seed key and to generate fresh random secrets.

The network element may also include one or more additional functional modules, such as an encryption module 60 to enable the GCKS to use one or more of the keys generated to secure communications with the group members during the communication process and in connection with transmission of keys on the network. The invention is not limited to a GCKS having only these particular modules as other modules may be implemented as well.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The control logic may be implemented as a set of program instructions that are stored in a computer readable memory within the network element and executed on a microprocessor, such as processor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of generating encryption keys, the method comprising:
    obtaining, by a computer processor environment, first information associated with a first key exchange session from a first group member;
    generating, by the computer processor environment from the first information, a first set of keys for the first group member and first additional pseudo-random information not for use by the first group member;
    obtaining, by the computer processor environment, second information associated with a second key exchange session from a second group member;
    generating, by the computer processor environment from the second information, a second set of keys for the second group member and second pseudo-random information not for use by the second group member; and
    combining, by the computer processor environment, the first additional pseudo-random information and second additional pseudo-random information with a fresh random secret to stretch the fresh random secret to enable additional encryption keys to be generated from the fresh random secret.

2. The method of claim 1, wherein the first additional pseudo-random information not for use by the first group member is obtained in connection with participating in a first key exchange procedure with the first group member, said first key exchange procedure comprising exchanging first nonces and Diffie-Hellman values, generating a first seedkey from the first nonces and Diffie-Hellman values, and using the first seedkey to generate the first set of keys for the first group member and first additional pseudo-random information not for use by the first group member.

3. The method of claim 2, wherein the first seedkey is used as input to a first pseudo-random function to generate a first stream of pseudo-random information, a first portion of said first stream of pseudo-random information being used to form the first set of encryption keys and a second portion of said first stream of pseudo-random information being used to form the first additional pseudo-random information not for use by the first group member.

4. The method of claim 3, wherein the second additional pseudo-random information not for use by the second group member is obtained in connection with participating in a second key exchange procedure with the second group member, said second key exchange procedure comprising exchanging second nonces and Diffie-Hellman values, generating a second seedkey from the second nonces and Diffie-Hellman values, and using the second seedkey to generate the second set of keys for the second group member and second additional pseudo-random information not for use by the second group member.

5. The method of claim 4, wherein the second seedkey is used as input to the first pseudo-random function to generate a second stream of pseudo-random information, a first portion of said second stream of pseudo-random information being used to form the second set of encryption keys and a second portion of said second stream of pseudo-random information being used to form the second additional pseudo-random information not for use by the first group member.

6. The method of claim 5, wherein combining the first additional pseudo-random information and second additional pseudo-random information with the fresh random secret is performed using a second pseudo-random function, the second pseudo-random function being different than the first pseudo-random function.

7. The method of claim 1, further comprising:
    obtaining additional information associated with other key exchange sessions from other group members; and
    generating, from the additional information, sets of keys for the other group members and additional pseudo-random information not for use by the other group members; and
    wherein combining the first additional pseudo-random information and second additional pseudo-random information further comprises combining the first and second additional pseudo-random information with the additional pseudo-random information not for use by the other group members with the fresh random secret to stretch the fresh random secret to enable additional encryption keys to be generated from the fresh random secret.

8. The method of claim 1, further comprising changing the fresh random secret from a first fresh random secret to a second fresh random secret.

9. The method of claim 8, wherein the second fresh random secret is generated by a physical entropy source.

10. A Group Controller Key Server (GCKS), comprising:
a tangible non-transitory computer readable storage medium containing program logic code stored thereon which, when loaded into a processor environment of the GCKS, causes the GCKS to implement a method of generating encryption keys, the method comprising:
obtaining first information associated with a first key exchange session from a first group member;
generating, from the first information, a first set of keys for the first group member and first additional pseudo-random information not for use by the first group member;
obtaining second information associated with a second key exchange session from a second group member;
generating, from the second information, a second set of keys for the second group member and second pseudo-random information not for use by the second group member; and
combining the first additional pseudo-random information and second additional pseudo-random information with a fresh random secret to stretch the fresh random secret to enable additional encryption keys to be generated from the fresh random secret.

11. The GCKS of claim 10, wherein the first additional pseudo-random information not for use by the first group member is obtained in connection with participating in a first key exchange procedure with the first group member, said first key exchange procedure comprising exchanging first nonces and Diffie-Hellman values, generating a first seedkey from the first nonces and Diffie-Hellman values, and using the first seedkey to generate the first set of keys for the first group member and first additional pseudo-random information not for use by the first group member.

12. The GCKS of claim 11, wherein the first seedkey is used as input to a first pseudo-random function to generate a first stream of pseudo-random information, a first portion of said first stream of pseudo-random information being used to form the first set of encryption keys and a second portion of said first stream of pseudo-random information being used to form the first additional pseudo-random information not for use by the first group member.

13. The GCKS of claim 12, wherein the second additional pseudo-random information not for use by the second group member is obtained in connection with participating in a second key exchange procedure with the second group member, said second key exchange procedure comprising exchanging second nonces and Diffie-Hellman values, generating a second seedkey from the second nonces and Diffie-Hellman values, and using the second seedkey to generate the second set of keys for the second group member and second additional pseudo-random information not for use by the second group member.

14. The GCKS of claim 13, wherein the second seedkey is used as input to the first pseudo-random function to generate a second stream of pseudo-random information, a first portion of said second stream of pseudo-random information being used to form the second set of encryption keys and a second portion of said second stream of pseudo-random information being used to form the second additional pseudo-random information not for use by the first group member.

15. The GCKS of claim 14, wherein combining the first additional pseudo-random information and second additional pseudo-random information with the fresh random secret is performed using a second pseudo-random function, the second pseudo-random function being different than the first pseudo-random function.

16. The GCKS of claim 10, wherein the method further comprises:
obtaining additional information associated with other key exchange sessions from other group members; and
generating, from the additional information, sets of keys for the other group members and additional pseudo-random information not for use by the other group members; and
wherein combining the first additional pseudo-random information and second additional pseudo-random information further comprises combining the first and second additional pseudo-random information with the additional pseudo-random information not for use by the other group members with the fresh random secret to stretch the fresh random secret to enable additional encryption keys to be generated from the fresh random secret.

17. The GCKS of claim 10, wherein the method further comprises changing the fresh random secret from a first fresh random secret to a second fresh random secret.

18. The GCKS of claim 17, wherein the second fresh random secret is generated by a physical entropy source.

* * * * *